United States Patent Office 3,640,905
Patented Feb. 8, 1972

3,640,905
CLINOPTILOLITE BLENDS WITH SHAPE-SELECTIVE CATALYST
Robert C. Wilson, Jr., Woodbury, N.J., assignor to Mobil Oil Corporation
No Drawing. Filed Jan. 21, 1969, Ser. No. 792,827
Int. Cl. B01j *11/40*
U.S. Cl. 252—455 Z   5 Claims

ABSTRACT OF THE DISCLOSURE

A method for the preparation of selective catalysts is disclosed which involves the blending of a crystalline aluminosilicate of the heulandite group with an aluminosilicate having an effective pore size of about 5 A. when the latter aluminosilicate is ion exchanged with cations to give it both an acidic function and a hydrogenation/dehydrogenation function. For reasons not completely understood, aluminosilicates of the heulandite group have a synergistic effect upon the 5 angstrom pore size aluminosilicate so that the resulting catalyst is more shape selective. Heulandite group aluminosilicates, i.e., heulandite, stilbite, epistilbite and clinoptilolite are bended with the 5 A. aluminosilicate in amounts ranging from about 20–80% by weight.

BACKGROUND OF THE INVENTION

This invention relates generally by crystalline aluminosilicate catalysts characterized by their ability to selectively direct conversion processes toward critical reaction paths and by their ability to direct the reaction of certain specific compounds from a mixture of reactants. More particularly, this invention relates to an improvement in the preparation of selective catalysts particularly adapted to direct conversion based on the shape or molecular dimension of the reactants or products involved. The selective catalysts are crystalline aluminosilicates having a hydrogenation/dehydrogenation component associated therewith.

In particular, the invention described herein is an improvement in catalytic hydrocracking operations carried out in the presence of a solid crystalline zeolitic structure of very well-defined intra-crystalline dimensions which has the ability, by reason of this intra-crystalline dimension, to allow the passage into or out of its crystalline cavities of only certain molecules, that is, of molecules having particular size or shape.

The use of crystalline aluminosilicates having catalytic activity located within the interior of the crystalline solid to effect selective catalytic conversion is known in the art, and in fact, is described and claimed in U.S. Pat. 3,140,-322. Said U.S. patent discloses and claims a wide variety of selective catalytic conversion processes utilizing crystalline aluminosilicates having catalytic activity located within the interior thereof and represents a significant advance in the utilization of the unusual properties of crystalline aluminosilicates to direct specific conversions.

However, it should be immediately apparent that in order to have a successful conversion catalyst, said catalyst must possess certain physical properties independent of its chemical activity and/or selectivity, and quite obviously, the necessary physical properties will vary depending upon the particular process or class of processes desired to be catalyzed. Thus, for example, a catalyst used at extremely high temperatures must be physically stable at those temperatures whereas high temperature stability is not necessarily required with a catalyst which is used to catalyze processes at low temperatures. Additionally, and perhaps more significantly, a crystalline aluminosilicate which is an effective shape-selective conversion catalyst for one process, may not be an effective catalyst for another process operated at a different set of conditions, due to the fact that it might be physically stable in the former process but not physically stable in the latter.

In accordance with the above, it has been found that in some cases when hydrogenation metals of Group VIII of the Periodic Table are associated with shape selective crystalline aluminosilicates, especially by ion exchange, the selective properties of these materials tend to deteriorate. Thus, aluminosilicates which have a selective acidic function in the absence of being associated with Group VIII metals tend to lose that function when they are employed in certain conversion processes such as hydrocracking wherein hydrogenation metals must also be employed.

One solution to the overall problem is disclosed and claimed in Ser. No. 522,368, filed Jan. 24, 1966, now U.S. Pat. No. 3,379,640. In this application a novel process is disclosed and claimed wherein stable and selective aluminosilicate catalysts are obtained by a process which involves careful control of the method in which the hydrogenation metals are associated with the aluminosilicates.

It has now been found that it is possible to prepare crystalline aluminosilicate conversion catalysts of enhanced selectivity which have both an acidic function and a hydrogenation/dehydrogenation function associated therewith by the simple expedient of compounding a shape selective crystalline aluminosilicate having an effective pore size of about 5 A. with at least one aluminosilicate from the heulandite group either before or after the acidic function and the Group VIII hydrogenation metal has been introduced.

The shape selective catalyst herein referred to is a crystalline aluminosilicate wherein a majority of its pores, which are substantially uniform dimension have an effective opening of 5 A., i.e., the pores are large enough to allow uptake and egress of normal paraffin molecules such as, for example, normal hexane, but too small to allow a similar uptake or either branched-chain or cyclic hydrocarbons. Additionally, in view of the fact that it is desired to have an acidic function associated with the aluminosilicates, it is necessary that for maximum stability these materials should have a silicon to aluminum ratio of at least 1.8. Quite obviously, the shape selective catalyst is other than from the heulandite group.

Accordingly, the shape selective conversion catalyst is a crystalline aluminosilicate not of the heulandite group having a pore size of about 5 A. and a silicon to aluminum ratio of at least 1.8. The aluminosilicates can be described as a three-dimensional framework of $SiO_2$ and $AlO_2$ tetrahedra in which the tetrahedra are cross-linked by the sharing of oxygen atoms whereby the ratio of total aluminum and silicon atoms to oxygen atoms is 1 to 2. The hydrated form aluminosilicates may be represented by the formula:

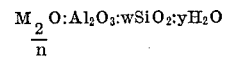

$$\frac{M_2}{n} O : Al_2O_3 : wSiO_2 : yH_2O$$

wherein M represents at least one cation which balances the electrovalence of the tetrahedra, $n$ represents the valence of the cation, $w$ the moles of $SiO_2$ and $y$ the moles of $H_2O$. The cation can be any or more of a number of metal ions depending whether the aluminosilicate is synthesized or occurs naturally. All or a portion of the cations originally associated with the aluminosilicate can be replaced with hydrogen ions, ammonium ions or other metal cations such as, for example, rare earth, calcium, magnesium, etc., or mixtures thereof.

Examples of suitable crystalline auminosilicates are to be found among a number of aluminosilicate materials, and among synthetically prepared crystalline aluminosilicates which have structure analogous to and sometimes differing from the materials known to occur naturally. Specific aluminosilicates include chabazite, gmelinite, erionite, offretite and Zeolite T.

As has heretofore been stated, the novel process of this invention involves the preparation of stable selective catalyts by blending the 5 A. aluminosilicates previously described, either before or after the introduction of the Group VIII hydrogenation metal, with an aluminosilicate of the heulandite group.

Aluminosilicates of the heulandite group are generally characterized as having elliptical, eight-membered and ten-membered rings with the opening of the eight-membered rings being about 2 A. by about 6 A. and the ten-membered rings about 3 A. by about 8 A. The members of this group include heulandite, stilbite, epistilbite and clinoptiolite.

By way of illustration, a 5 A. crystalline aluminosilicate such as erionite is merely blended with a heulandite group aluminosilicate such as clinoptiolite and the resulting mixture is thereafter ion exchanged with ions known to impart acid activity thereto, i.e., hydrogen ions, ammonium, ions, rare earth cations, and manganese ions and with cations of metals having hydrogenation activity, e.g., nickel cations. The ion exchanged composite is then washed with water, dried, compacted and calcined in a conventional manner.

It is to be immediately appreciated the reason why blending a 5 A. aluminosilicate with a heulandite group aluminosilicate such as clinoptilolite functions to produce a stable catalyst is not understood. It is possible that the use of clinoptilolite with the 5 A. component causes the Group VIII hydrogenation metal to reorient itself and thus, increase the stability of the aluminosilicate, but such theory has not been completely substantiated.

In any event, irrespective of the theoretical considerations, the simple fact remains that the novel process of this invention results in the production of a stable and selective catalyst.

The relative proportions of the two aluminosilicates which are employed are not narrowly critical and in most cases, it has been found that the aluminosilicates of the heulandite group should be present in the composite in amounts ranging from 20 to 80% by weight. The preferred concentration is from about 30 to 60% by weight based on the weight of the total composite.

The method of compositing the two aluminosilicates is not narrowly critical and various alternate procedures have been successfully employed. These procedures will be illustrated by reference to erionite as the shape selective aluminosilicate and to clinoptilolite as the heulandite group aluminosilicate although, quite obviously, this invention is not to be limited to these two materials.

Thus, by way of illustration, erionite can be compounded with clinoptilolite, powdered, and then ion exchanged with a source of hydrogen ions and nickel cations. The erionite can also be base exchanged with a source of ammonium ions and nickel ions to form a wet cake and blended with clinoptilolite which has itself been exchanged with a source of ammonium ions and nickel ions to form a wet cake and thereafter the mixture dried, compacted and calcined. Still another method of obtaining a successful catalyst would be to base exchange erionite with a source of ammonium ions and nickel ions and blend the resulting dried material with dried clinoptilolite similarly base exchanged, then compact and calcine the blend. Additionally, erionite can be treated with a source of ammonium cations and nickel ions, dried and calcined and admixed with clinoptilolite which has been similarly treated, and the resulting components blended intimately and then compacted.

It is to be immediately noted that the clinoptilolite need not be ion exchanged with either the Group VIII metal or the cation having an acidic function in order for it to exert its synergistic effect with the shape selective crystalline aluminosilicates, i.e., a shape selective aluminosilicate such as erionite can be base exchanged with a source of ammonium ions and nickel cations and blended with clinoptilolite ore in either its natural state or in its ammonium exchanged form and the mixture compacted and then calcined to produce an excellent stable and selective catalyst.

Similarly, the clinoptilolite can have cations other than Group VIII metals associated therewith and still exert its synergistic effect on the shape selective aluminosilicate. Thus, erionite can be ion exchanged with a source of ammonium and nickel cations and blended with clinoptilolite which has itself been ion exchanged with ammonium and zinc cations and the mixture compacted and calcined to produce an excellent catalyst.

The Group VIII metals which can be introduced into the aluminosilicate by ion exchange include iron, cobalt, nickel, ruthenium, rhodium, palladium, osmium, iridium and platinum. Of these metals the particularly preferred one is nickel.

The metals are introduced by contacting the 5 A. aluminosilicate with salt solutions either before or after mixing with the heulandite group aluminosilicate.

Representative of the metal salts which can be employed to contact the aluminosilicates include chlorides, bromides, iodides, carbonates, bicarbonates, sulfates, sulfides, thiocyanates, dithiocarbonates, peroxysulfates, acetates, benzoates, citrates, fluorides, nitrates, nitrites, formates, etc. The only limitation of the particular salts is that they be sufficiently soluble to give the necessary ion transfer. The preferred salts are chlorides, nitrates, sulfates and acetates.

Following the treatment with the solution of metal salts, the aluminosilicate is washed with water, preferably distilled water, and generally thereafter dried between 150° F. and 600° F. The aluminosilicate can thereafter be heated in air, steam, or hydrogen or in an inert atmosphere of nitrogen, helium, etc. or in mixtures thereof at temperatures ranging from about 500° F. to 1500° F. for periods of time ranging from about 0.25 to 48 hours or more.

The following examples will illustrate the novel process of this invention, but it is not intended that it be limited thereto.

EXAMPLES 1–7

A natural crystalline aluminosilicate identified as erionite obtained from Nevada and analyzing as follows:

| | Weight percent |
|---|---|
| $SiO_2$ | 68.4 |
| $Al_2O_3$ | 16.2 |
| $Fe_2O_3$ | 2.7 |
| $K_2O$ | 4.4 |
| $CaO$ | 2.0 |
| $Na_2O$ | 4.7 |
| $MgO$ | 1.3 | and having a silica to alumina mol ratio of 7.2, was powdered and blended with varying proportions of a powdered small pore size aluminosilicate identified as clinoptilolite and labeled as follows:

| Catalyst | Weight percent erionite | Weight percent clinoptilolite |
|---|---|---|
| A | 100 | 0 |
| B | 90 | 10 |
| C | 80 | 20 |
| D | 60 | 40 |
| E | 40 | 60 |
| F | 20 | 80 |
| G | 0 | 100 |

After intimate mixing in those cases where the catalysts contained two components, i.e., B through F, all the catalysts were subjected to two contacts of 4 hours each at 180° F. with a 5 molar ammonium chloride solution and one contact of 4 hours in duration at 210° F. with a half molar nickel acetate solution. The solutions were such that 19 equivalents of ammonium ion per gram-atom of aluminum were employed and 1.5 equivalents of nickel per gram atom of aluminum were employed.

The catalysts were then washed, dried, compacted and calcined and then evaluated for the catalytic cracking of hydrocarbons according to the following test procedures: A blend consisting of 50 weight percent n-hexane and 50 weight percent isohexane was passed at a flow rate of 10 ml. per hour together with hydrogen at a flow rate of 4 liters per minute (atmospheric pressure, 60° F.) over 3.5 cc. of the catalyst (10/14 mesh) at a temperature of 900° F. and pressure of 500 p.s.i.g.

At these conditions the LHSV is 2.86 and the $H_2$/HC mol ratio is about 130. After one hour on stream the products were evaluated with the following results, wherein $$\text{Gas factor} = \frac{C_3 + C_4}{C_1 + C_2} \text{ wt. ratio}$$

|  | A | B | C | D | E | F | G |
|---|---|---|---|---|---|---|---|
| Ni (as NiO), wt. percent | 4.5 | 5.1 | 4.8 | 4.6 | 4.3 | 4.5 | 3.9 |
| n-$C_6$ conversion, wt. percent | 100 | 100 | 95.6 | 76.2 | 54.6 | 52.2 | 35.0 |
| i-$C_6$ conversion, wt. percent | 100 | 100 | 88.4 | 24.4 | 13.8 | 11.0 | 7.0 |
| Gas factor | 0.0 | 0.3 | 1.3 | 6.4 | 7.6 | 8.1 | 6.6 |

In order to obtain an excellent shape selective catalyst, the conversion of normal hexane should be high and the conversion of isohexane should be extremely low. Additionally, the gas factor should be high since it is desirous to produce more $C_3$'s and $C_4$'s than the $C_1$ and $C_2$'s.

Thus, it can be seen that catalysts A and B are wholly inoperative since they possess absolutely no selectivity, i.e., they crack as much isohexane as normal hexane. Catalyst G is so low in activity so that it is unacceptable as a hydrocracking catalyst. Catalysts D, E and F are all excellent stable selective hydrocracking catalysts.

The effect of the clinoptilolite is clearly demonstrated in the above examples since the catalysts without clinoptilolite, i.e., catalyst A, possessed no selective properties whereas the addition of clinoptilolite to this catalyst resulted in a dramatic improvement.

EXAMPLE 8

This example will illustrate that it is not necessary to add the clinoptilolite before ion exchanging.

60 parts by weight of catalyst A and 40 parts by weight of catalyst G of Example 1 were merely mixed together and evaluated for the conversion of normal and isohexane in the same manner as Example 1 with the following results:

Ni (as NiO), wt. percent _____ 4.3
n–$C_6$ conversion, wt. percent _____ 72.4
i–$C_6$ conversion, wt. percent _____ 29.2
Gas factor _____ 4.3

This example clearly shows the synergistic effect of the addition of clinoptilolite.

EXAMPLE 9

The procedure of Examples 1–7 was repeated with the exception that natural chabazite was employed instead of natural erionite.

The natural chabazite was treated in the same manner as that set forth in Examples 1–7 and evaluated as a catalyst with the following results:

|  | 100% natural chabazite | 60% natural chabazite, 40% clinoptilolite |
|---|---|---|
| Ni (as NiO), wt. percent | 5.7 | 4.1 |
| n-$C_6$ conversion, wt percent | 97.8 | 57.6 |
| i-$C_6$ conversion, wt. percent | 93.6 | 9.8 |
| Gas factor | 0.5 | 3.0 |

The above example clearly demonstrates that the novel process of this invention results in production of a stable shape selective catalyst.

EXAMPLE 10

The procedure of Example 9 was repeated with the exception that a synthetic crystalline aluminosilicate identified as Zeolite T was employed instead of the natural chabazite.

The results are as follows:

|  | 100% Zeolite T | 60% Zeolite T, 40% clinoptilolite |
|---|---|---|
| Ni (as NiO), wt. percent | 4.0 | 3.2 |
| n-$C_6$ conversion, wt. percent | 92.4 | 62.2 |
| i-$C_6$ conversion, wt. percent | 71.0 | 17.8 |
| Gas factor | 1.4 | 3.9 |

This example also demonstrates the fact that the addition of clinoptilolite to a 5 A. aluminosilicate has a synergistic effect in the production of a shape selective catalyst.

EXAMPLE 11

This example will illustrate that the clinoptilolite need not be ion exchanged in order to obtain the desired results.

60% by weight of erionite, which had been ion exchanged with ammonium ions and nickel ions, washed and dried in the manner set forth in Examples 1–7, was merely blended with 40% by weight raw clinoptilolite ore.

The mixture was then tested for catalytic properties in the manner previously set forth with the following results:

Ni (as NiO), wt. percent _____ 2.7
n–$C_6$ conversion, wt. percent _____ 57.0
i–$C_6$ conversion, wt. percent _____ 13.0
Gas factor _____ 7.4

EXAMPLE 12

The procedure of Example 11 was repeated with the exception that the clinoptilolite was ion exchanged with ammonium ions, washed and dried in the manner set forth in Example 1.

When evaluated for catalytic hydrocracking the following results were obtained:

Ni (as NiO), wt. percent _____ 2.7
n–$C_6$ conversion, wt. percent _____ 63.8
i–$C_6$ conversion, wt. percent _____ 17.8
Gas factor _____ 7.3

The above examples illustrate the fact that the improved results of this invention are obtained irrespective of the cations associated with clinoptilolite.

The following examples will illustrate that the clinoptilolite can contain metal cations other than those of Group VIII and still provide excellent results.

EXAMPLE 13

Clinoptilolite was ion exchanged with both ammonium cations and zinc cations, washed and dried to yield a catalyst having 3.3 weight percent zinc determined as zinc oxide. The catalyst was calcined and labeled Catalyst H.

EXAMPLE 14

40 parts by weight of the catalyst of Example 13, i.e., Catalyst H, and 60 parts by weight of nickel-acid erionite (Catalyst A) were merely compacted and calcined. This mixture was labeled Catalyst I.

Catalysts A, H and I were then evaluated in accordance with the test procedure set forth in Examples 1–7. The results were as follows:

|  | A | H | I |
|---|---|---|---|
| Ni (as NiO), wt. percent | 4.5 |  | 2.7 |
| Zn (as ZnO), wt. percent |  | 3.3 | 1.3 |
| n-$C_6$ conversion, wt. percent | 100 | 76.2 | 85.6 |
| i-$C_6$ conversion, wt. percent | 100 | 4.4 | 22.2 |
| Gas factor | 0.0 | 2.1 | 4.2 |

The above clearly demonstrates the improved results obtained from the use of a blend of clinoptilolite in accordance with the teachings of this invention.

EXAMPLES 15-19

Examples 15-19 will illustrate that another member of the heulandite family, i.e., stilbite, also exerts a synergistic effect on aluminosilicates having a pore size of about 5 A.

In these examples, the general procedure of Examples 1-7 was repeated with the exception that stilbite was employed instead of clinoptilolite.

The various catalysts were then tested in the identical manner of Examples 1-7, except at a temperature of 700° F., and the results of said testing as well as the proportions of the particular catalysts are shown in the following table.

|  | Example Number | | | | |
|---|---|---|---|---|---|
|  | 15 | 16 | 17 | 18 | 19 |
|  | 100% erionite | 25% stilbite, 75% erionite | 50% stilbite, 50% erionite | 75% stilbite, 25% erionite | 100% stilbite |
| $NiO_2$, wt. percent | 4.5 | 5.4 | 4.7 | 4.6 | 3.1 |
| n-$C_6$ conversion, wt. percent | 38.0 | 49.0 | 75.0 | 83.0 | 58.0 |
| i-$C_6$ conversion, wt. percent | 26.8 | 35.6 | 67.2 | 78.0 | 50.8 |

The above examples dramatically illustrate the synergistic effect exerted by stilbite in that the conversion of the catalyst of Examples 17 and 18 is higher than that of both of its components.

EXAMPLES 20-21

To further demonstrate the synergistic effect of stilbite the catalyst of Example 17 was tested at various conversion levels and the resulting data were interpolated at the same conversion levels of Example 15, i.e., the 100% erionite and Example 19, i.e., the 100% stilbite. Thus, the conversion of the 50—50 mixture of stilbite and erionite was compared at the same conversion activity as the 100% stilbite and 100% erionite. The results were as follows:

| Example No. | 15 | 19 | 20 | 21 |
|---|---|---|---|---|
| Reactor temperature, ° F | 700 | 700 | 665 | 685 |
| n-$C_6$ conversion, percent wt | 38.0 | 58.0 | 38.0 | 58.0 |
| i-$C_6$ conversion, percent wt | 26.8 | 50.8 | 20.0 | 41.0 |

The above data clearly demonstrates the improved selectivity resulting from the use of a catalyst composite as opposed to the components of said composite. Thus, it can be seen that in order to obtain the same conversion as in Example 15, a 35° lower temperature was necessary in Example 20. Additionally, comparing the results of Example 15 with those of 20, it can be seen that at the same conversion level the catalyst of Example 20 had a far higher selectivity. In like manner, comparison of Examples 19 and 21 show that the composite of Example 21 is more active, i.e., 15° lower temperature was required for the same conversion, and far more selective in that less isohexane was converted than with the corresponding 100% stilbite of Example 19.

What is claimed is:
1. A composition obtained by mixing:
 (1) a crystalline aluminosilicate other than a member of the heulandite group with (2) an aluminosilicate selected from the group consisting of heulandite, stilbite, epistilbite, and clinoptilolite; said aluminosilicate (1) being characterized as having:
  (a) a pore size of about 5 angstrom units, and
  (b) a silicon to aluminum ratio of at least 1.8, said composition being associated with Group VIII metals and acidic cations.
2. A composition obtained by mixing:
 (1) an aluminosilicate having a pore size of about 5 angstrom units selected from the group consisting of erionite, chabazite and Zeolite T with (a) an aluminosilicate selected from the group consisting of heulandite, stilbite, epistilibite and clinoptiloite; said composition containing cations of a Group VIII metal and cations selected from the group consisting of ammonium ions, hydrogen ions, rare earth ions, and mixtures thereof.
3. A composition obtained by mixing:
 (1) an aluminosilicate having a pore size of about 5 angstrom units selected from the group consisting of erionite, chabazite and Zeolite T with (a) an aluminosilicate selected from the group consisting of heulandite, stilbite, epistilbite, and clinotilolite;
 said composition containing nickel cations and cations selected from the group consisting of ammonium ions, hydrogen ions, rare earth ions, and mixtures thereof.
4. A composition obtained by mixing stilbite with erionite, wherein the stilibite, is present in the total composition in the amount of 20 to 80 percent by weight, said composition containing ammonium ions and nickel ions.
5. A composition obtained by mixing clinoptilolite with erionite wherein the clinoptilolite is present in the total composition in the amount of 20 to 80 percent by weight, said composition containing ammonium ions and nickel ions.

References Cited
UNITED STATES PATENTS

| 3,379,640 | 4/1963 | Chen et al. | 252—455 X |
| 3,238,123 | 3/1966 | Voorhies et al. | 252—455 Z |
| 3,257,311 | 6/1966 | Frilette et al. | 252—455 X |

DANIEL E. WYMAN, Primary Examiner

C. F. DEES, Assistant Examiner